US007181048B2

(12) United States Patent
Blume

(10) Patent No.: US 7,181,048 B2
(45) Date of Patent: Feb. 20, 2007

(54) BIOMETRIC CAPTURE ADAPTER FOR DIGITAL IMAGING DEVICES

(75) Inventor: Leo Robert Blume, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 10/185,209

(22) Filed: Jun. 28, 2002

(65) Prior Publication Data

US 2004/0001617 A1    Jan. 1, 2004

(51) Int. Cl.
*G06K 9/00*    (2006.01)

(52) U.S. Cl. .................. 382/115; 382/313; 713/186

(58) Field of Classification Search ............. 382/124, 382/126, 115, 313; 713/186
See application file for complete search history.

(56) References Cited

U.S. PATENT DOCUMENTS

| 5,737,439 A | * | 4/1998 | Lapsley et al. ............. 382/115 |
| 5,790,668 A | * | 8/1998 | Tomko ........................ 713/186 |
| 6,487,662 B1 | * | 11/2002 | Kharon et al. ............... 713/186 |
| 6,700,606 B1 | * | 3/2004 | Borza ....................... 348/218.1 |
| 6,867,850 B2 | * | 3/2005 | McClurg et al. .............. 356/71 |
| 6,872,916 B2 | * | 3/2005 | Carver et al. ................ 219/201 |
| 7,081,951 B2 | * | 7/2006 | Carver et al. ................. 356/71 |
| 2003/0023882 A1 | * | 1/2003 | Udom ........................ 713/202 |
| 2004/0001617 A1 | * | 1/2004 | Blume ........................ 382/126 |

* cited by examiner

*Primary Examiner*—Gregory Desire

(57) ABSTRACT

An adapter suitable for use with digital cameras (and other digital imaging devices) converts the digital camera to a biometric scanner. One exemplary adapter includes a receptacle for receiving a body part, a coupler for attachment to the digital camera, and one or more optical components for acquiring an image of a biometric characteristic of the body part. Optional features might include: (a) automatically detecting of the body part and transmitting a command to an input interface of the camera; (b) using auxiliary lighting to illuminate the biometric image; (b) digitally post-processing the image after acquisition but prior to authentication; and/or (d) acquiring a biometric utterance of the user providing the biometric image for dual-factor biometric authentication; and/or still other features described herein.

38 Claims, 2 Drawing Sheets

BIOMETRIC CAPTURE ADAPTER FOR DIGITAL IMAGING DEVICES

FIELD

This patent application pertains generally to the field of digital imaging devices, and more specifically, to a biometric capture adapter for converting a digital camera into a scanner for biometric authentication applications.

BACKGROUND

Biometric authentication is generally regarded as being more secure, and also more user-friendly, than conventional forms of authentication. Examples of biometric authentication include the use of fingerprints, voice patterns, retinal patterns, and/or other physiological characteristics of a user to uniquely identify that user.

Typically, when the user wishes to access a protected application (e.g., secure building, secure area within a building, secure computer, secure software application, etc.), the user is asked to provide a substantially real-time sample of the biometric characteristic. For example, he might place his finger in a fingerprint scanner, speak a voice sample into a microphone, peer into a retinal scanner, etc. The real-time sample is captured electronically (typically digitally), and compared to a stored sample. If the captured sample matches the stored sample, the user is given access.

Biometric authentication relies on "something the user is" and, therefore, is more secure than conventional authentication which relies on "what the user has" (e.g., a password, a private key, etc.). Something the user inherently "is" is not easily stolen, in contrast to a user-held quantity that the user "has." Biometric authentication is also more user-friendly because the user need not carry around (or otherwise maintain access to) an external authentication datum.

However, biometric authentication is not infrastructure-friendly, because of the relative scarcity of biometric scanners. This scarcity, in turn, reflects the fact that biometric data acquisition is much more expensive than conventional authentication. For example, a fingerprint- or retinal-based biometric scanner requires optics (to visualize the biometric data), image acquisition hardware/software (to capture the data), digital processing software (to transform the data to a standard format at an acceptable quality level), and a moderately high bandwidth connection to a computer (to transmit the data for authentication). In contrast, in a conventional authentication scheme, a simple pop-up field in a web browser is sufficient to capture the password or other alphanumeric datum. The expense and complexity of biometric scanners is a significant reason why biometric authentication has to date only been widely deployed in ultra high security environments (e.g., nuclear power plants, defense facilities, bioresearch labs, etc.) but not in home, office, bank and other everyday commercial environments. Of course, cost reduction would also increase the availability of biometric authentication for ultra high security environments as well.

At the same time, the consumer electronics industry has been steadily driving down the price point, or at least providing increased functionality per unit price, of (still and video) digital cameras and other digital data acquisition devices. Many such devices in common use in home and business environments now contain sufficiently high quality optical and/or sound capture, data acquisition, data processing, and interface capabilities to serve as platforms for biometric data acquisition.

Thus, it would be desirable to have devices and processes to convert commercially available digital imaging devices into biometric scanners.

SUMMARY

An exemplary method for acquiring biometric data comprises: providing a general purpose digital camera; coupling a biometric capture adapter to the digital camera; placing a body part having a biometric characteristic of interest into a receptacle of the biometric capture adapter; and acquiring an image of the biometric characteristic by operating the general purpose digital camera in conjunction with the biometric capture adapter.

An exemplary biometric adapter, for converting a digital camera into a biometric data acquisition device, comprises: a coupler for attachment to the camera; a receptacle configured to receive a body part having a biometric characteristic of interest; one or more optical components oriented with respect to said lens to optically scale the biometric characteristic to a predetermined size (thereby forming a biometric image which is a function of the size of the camera's array and the imaging capability of the camera's lens); and a structural housing connected to said coupler and at least one of said optical components.

Other exemplary alternative embodiments and aspects are also disclosed.

DETAILED DESCRIPTION

I. Camera with Which the Adapter May be Used

We begin by describing the generic characteristics of a digital camera with which the adapter may be used. As used herein, the term "digital camera" may include a still camera, a video camera, or yet some other form of general purpose digital imaging device. Common characteristics of such a digital camera would typically include a housing, a lens for imaging data, an image acquisition array configured to electronically capture the imaged data, a digital processor to transform the captured data into a predetermined image format, an electricity source configured to power the sensor and the digital processor, and an interface capable of outputting the captured data.

The camera's image acquisition array is typically a two-dimensional array (e.g., a CCD, CID or CMOS sensor), but could also include other arrays known to those skilled in the art or developed in the future. The form of the array is not material, as long as the array is capable of acquiring the image presented through the lens. The digital processor could be implemented in hardware, in software running on a computer processor, in microcode, or in some combination of the foregoing. The electricity source could include a battery, AC power, a solar panel, or still other power sources. The interface through which the camera can output its captured data might include a tape, a removable memory card, a wired interface (e.g., accessory shoe, S-video connector, USB, IEEE 1394 high speed serial bus (a.k.a FireWire), or other serial or parallel connector, etc.), a wireless interface (e.g., infrared port), etc. In all of the foregoing, the form of the particular element is immaterial, it being understood that the biometric adapter technologies disclosed herein are not limited to any particular implementation of a digital camera.

II. Exemplary Biometric Capture Adapter

Figure 1:
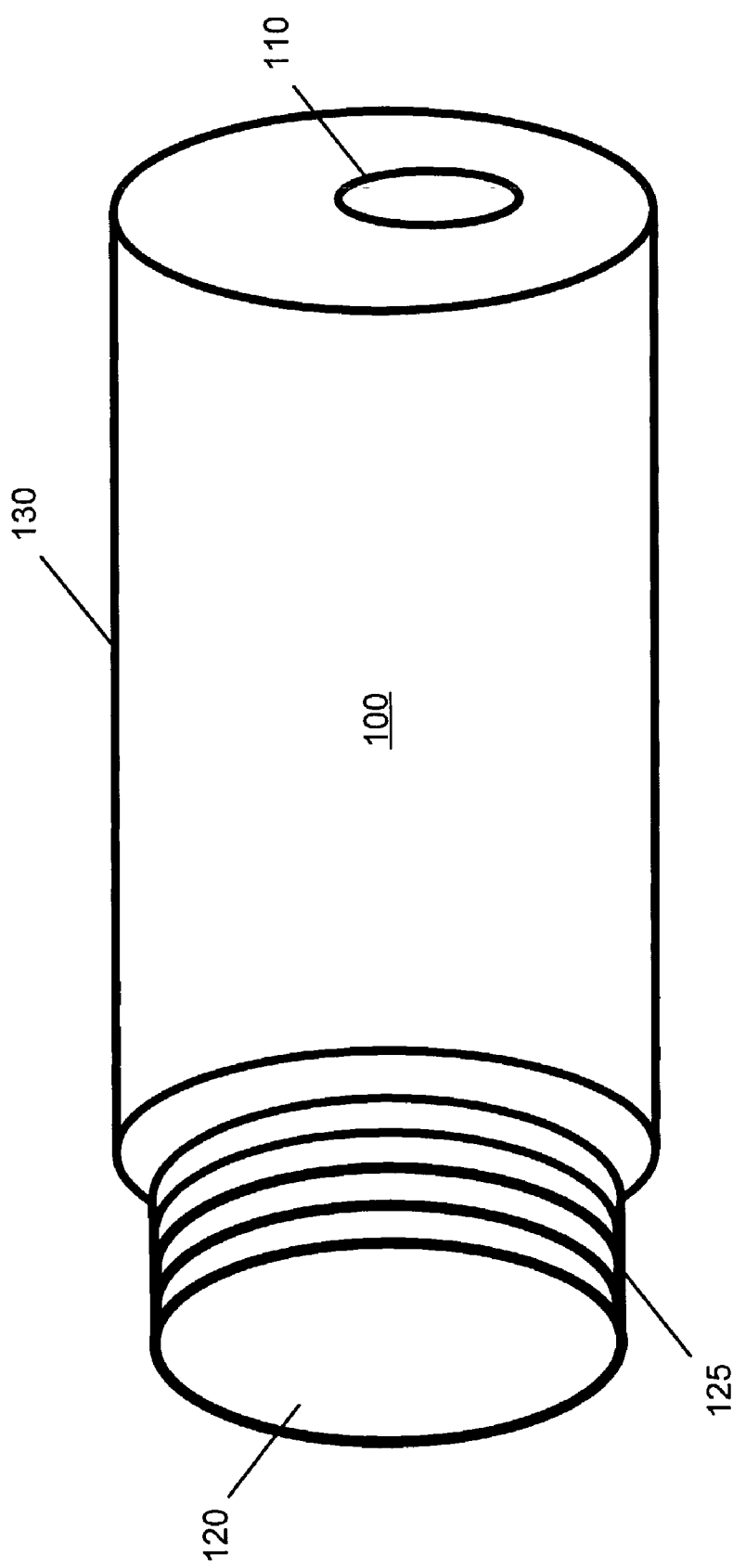
FIG. 1 illustrates an exemplary biometric capture adapter for use with a digital camera.

FIG. 1 illustrates an external view of an exemplary biometric capture adapter 100 suitable for use with a digital camera.

A. Receptacle

As shown in FIG. 1, adapter 100 includes a receptacle 110 (see also FIG. 2) configured to receive a body part having a biometric characteristic of interest. For example, if a fingerprint were the biometric characteristic of interest, the receptacle might be a finger cavity. Similarly, if a retinal scan (or other eye feature) were the biometric characteristic of interest, the receptacle might be an eyecup or other form of eyepiece. Those skilled in the art will readily appreciate that still other forms of receptacle will be appropriate for other body parts. Such receptacles may be wholly or partially enclosed, open, curved, planar, or of any suitable configuration appropriate to the body part being imaged. Similarly, references to placing a body part "into" the receptacle should also be understood to include placing the body part on, or onto, the receptacle as appropriate.

The receptacle may optionally include one or more guides for orienting the body part in a preferential orientation. For example, a fingerprint biometric adapter might include a specially curved surface (e.g., for centering the fingertip), guide rails (e.g., for aligning the finger as a whole), or still other forms of guides. Similarly, a retinal biometric adapter might include a forehead bracket (e.g., to align the eye by aligning the head as a whole), an eyecup of a special aspect ratio (e.g., to align the eye in a preferred orientation), or still other forms of guides.

B. Coupler

The exemplary adapter 100 is attachable to the digital camera via a coupler 120, which brings the adapter into contact (or at least sufficiently close proximity) to the camera to operate in conjunction therewith. In one exemplary implementation, coupler 120 might include a threaded element 125 (e.g., collar, ring, flange, etc.) for connection to a corresponding element at the end of the camera lens (see also FIG. 2). For example, many camera lens housings have female threads for filters, extension optics, etc.

C. Structural Housing

In this exemplary embodiment, the coupler is connected to (i.e., it couples the camera to) a structural housing 130 of the adapter. In the case of a lens-mounted adapter, the housing could include a cylindrical tube, with the coupler 120 being the aforementioned threaded collar, etc. attached to the camera end of the tube.

In addition to serving to attach the adapter to the camera, the housing typically also serves as a structural support for one or more optical components within the adapter.

The housing and the coupler could be separate elements, or they could be integrally formed.

D. Optical Components

The optical component(s) are typically chosen depending on the inherent characteristics of the lens and other imaging functionality of the camera to which the adapter is attached. The optical component(s) are chosen to operate in conjunction with the camera to acquire and optically scale the biometric characteristic to a predetermined size.

Figure 2:
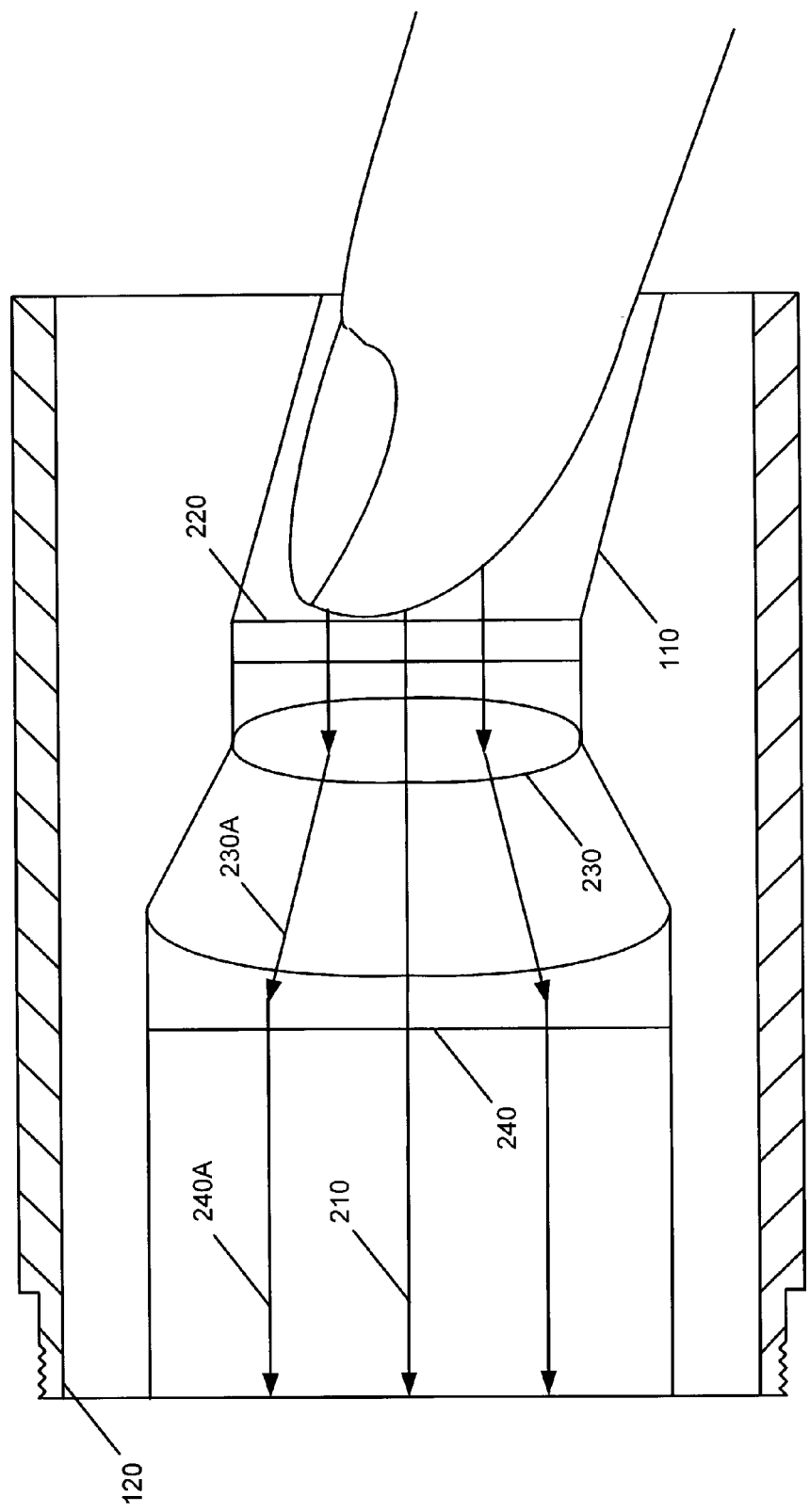
FIG. 2 illustrates a cross-sectional schematic of an exemplary biometric capture adapter for fingerprint biometric data.

For example, consider an exemplary adapter for fingerprint biometrics as shown schematically in FIG. 2. In FIG. 2, for clarity purposes, internal hardware (e.g., lens mounts, etc.) is not shown. In this adapter, the receptacle comprises a finger cavity such that the tip of the finger is presented in an orientation perpendicular to the optical axis 210 of the adapter and camera lens. In that case, the optical component(s) might include a glass (or other optically transparent) plate 220 against which the tip of the finger can rest. Alternatively, the plate could be replaced with a curved transparent finger pad.

If the camera lens has a focal length (either per se or via a mechanical or digital zoom capability) that allows the image of the finger tip to be projected on the camera array without any need for enlargement or reduction, little more than the simple transparent plate 220 is required. That is, the plate alone will produce the desired image sizes which are determined in accordance with the physical size of the array and the imaging capability of the camera lens.

However, if the actual size of the finger tip is too small (or too large) compared to the image thereof presented at the camera's imaging array, one or more lenses may be used to adjust the image size. In the exemplary embodiment of FIG. 2, the finger tip is too small, and a convex lens 230 is first used to expand the image (resulting in diverging light rays 230A propagating along the direction of the optical axis), followed by a concave lens 240 (which brings the light rays back into parallelism at 240A). In addition to sizing, the lens(es) may also be selected to bring the finger tip into focus at the camera's imaging array.

As another example, if the finger tip is not oriented perpendicularly to the optical axis as in FIG. 2, one or more mirrors or other image-turning components could be used as part of the adapter. Similarly, if the image needs to be rotated about the optical axis (e.g., from a "portrait" to a "landscape" orientation, or some other degree of rotation), one or more known image rotators could be used. For example, see the so-called "Frazier lens" (www.wipo.org/sme/en/case_studies/frazier.htm), and also the so-called "acousto-optic dove prism" (www.spie.org/web/oer/july/jul98/sunny.html).

Still other optical component(s) will be apparent to those skilled in the art of optics, with the particular choice being a function of the camera, optical and physical characteristics of the lens and array, the size of the biometric characteristic to be imaged and its distance from the camera, and still other factors.

II. Optional Aspects and/or Alternative Embodiments

The foregoing illustrates a relatively simple embodiment of the digital capture adapter. This section sets forth still other optional aspects and/or alternative embodiments with which the capture adapter may be used.

A. Indirect Mounting

As described in the exemplary embodiment above, the adapter was directly mounted to the camera lens. However, other alternative coupling arrangements are also possible. For example, if the housing 130 is not directly affixed to the camera lens, the coupler may in some cases (as a matter of design choice) include only an indirect coupler. Depending on design choice, the indirect coupler may provide any or all of the following: structural rigidity; relative positioning of the camera lens and the adapter; and/or enhanced optical performance (e.g., by preventing stray light from entering the camera lens). For example, if the camera and biometric capture adapter are used on a tabletop or other rigid surface, it may be unnecessary to rigidly structurally couple them together. Instead, the indirect coupler need only bring the camera and the adapter sufficiently close together that the biometric image can be imaged by the camera at a desired size and/or resolution. Such an indirect coupler might include, without limitation, a bellows, a rubber flange, a telescoping extension, etc. The coupler would extend toward, and perhaps even touch (in order to align itself with) the camera lens. However, the coupler need not actually be rigidly affixed to the lens (although this is certainly possible, in which case the coupler would effect a direct coupling).

If there is a significant gap between the camera lens and the adapter, leading to unwanted external light incursion, the indirect coupler could also extend around, or otherwise circumscribe, the lens in the manner of a telescoping tube, a housing, a drape, etc.

B. Alternative Coupling

In the foregoing exemplary embodiments, the adapter is disposed adjacent to the camera lens for close-up photography of the biometric characteristic of interest. However, many commonly practiced ways of converting an existing camera-lens combination to "close-up" or "macro" operation involve some form of extending the distance between the camera and the lens via extension tubes (with or without lenses), and/or other optical components. Even without a lens, the extension tube may be considered to act as an optical component because it changes the optical path. The extension tube, of course, could also be a structural housing for the adapter. That is, the extension tube could comprise an integrated optical component and structural housing. Accordingly, in an alternative embodiment, the biometric capture adapter may comprise one or more components to be so disposed. For example, if the digital camera includes a removable lens, an optical component of the adapter could be mounted between the camera body and the removable lens, while the receptacle of the adapter could be mounted after the lens.

C. Tripod Mount

Most cameras include a standard (e.g., ¼"×20) threaded hole allowing the camera to be mounted to a tripod (or other support). Thus, the coupler could include a corresponding threaded shaft (screw, bolt, etc.) for connection to the camera's tripod mount.

In such a case, an intermediate member external to the body of the housing could be used to connect the coupler (e.g., the threaded screw) to the tripod mount. For example and without limitation, the intermediate member could be an arm extending beneath the housing and drilled to accept the threaded shaft for coupling to the camera's tripod mount. The coupler, arm and housing could all be integral with each other, or separate elements.

The tripod mount could be used either as part of a direct coupling, or in conjunction with an indirect coupling.

D. Accessory Shoe Mounting

Typically, the camera's tripod mount is at the bottom of the camera body. Many cameras also include a so-called accessory "shoe," for example, a rectangular flanged slot into which a flash or other accessory can be mounted to the camera. Thus, the digital capture adapter could be provided with a "foot" corresponding to the "shoe" for coupling thereto. The foot would typically be connected to the housing via an intermediate member analogous to the exemplary arm of the tripod mount.

The accessory shoe mount could either be used as part of a direct coupling, or in conjunction with an indirect coupling.

E. Accessory Shoe Interface for Operational Coordination

Typically, the camera's accessory shoe also serves as an interface capable of transmitting and/or receiving electrical signals. For example, where a flash is attached to the shoe, the camera may send a command to trigger to fire the flash at the precise moment the shutter is open, and/or to receive feedback signals from the flash.

If the adapter is equipped with auxiliary lighting, such lighting can be controlled by the camera in the same fashion as the flash. This is an example of an electrically enabled accessory shoe allowing a relatively "smart" camera to coordinate its operation to accommodate a relatively "dumb" adapter.

Of course, the accessory shoe is not limited to lighting control, but can be used more generally for coordinating operation of the biometric capture adapter with the camera. This will of course depend on the configuration of the camera and adapter, the number and types of signals each can send/receive through the accessory shoe, and also on the camera and adapter's ability to process those signals.

For example, many models in Sony's DCR line of digital camcorders include a so-called "intelligent accessory shoe" capable of passing signals to/from the camcorder's IC chip for processing. Such signals can include camcorder-controllable power to the accessory, video signals from an attached visualization device, etc. For example, the Indigo Systems' ThermoCorder (http://www.indigosystems.com/thermo-corder.html) is an infrared thermal imaging accessory that supplants the camcorder's visual imaging capability while retaining the camcorder's tape recording capability. The ThermoCorder's infrared video image is passed through the intelligent accessory shoe to the camcorder's processing and recording mechanisms. This is an example of an electrically enabled accessory shoe allowing a relatively "smart" camera to coordinate its operation with a relatively "smart" adapter.

In general then, the electrically enabled accessory shoe can be used to enable many aspects of camera-adapter operation relevant to biometric capture, including without limitation: auxiliary lighting, operational commands, and an in-line encoder—all of which will be described in greater detail below.

F. Other Interfaces for Operational Coordination

In addition to, or instead of an accessory shoe interface, many digital cameras also include an infrared interface (e.g., for a remote controller) and/or a wired serial interface (e.g., USB, IEEE 1394 high speed serial bus (a.k.a FireWire), etc.). Each of these interfaces can transmit a number of operational commands to/from the camera. Thus, just as with the accessory shoe interface, these other interfaces can also be used to coordinate operation of the camera and the adapter.

G. Close Up/Macro Focus Mode

The adapter could also be configured to place the camera in close up or macro focus mode (if available). This could be done, for example, by mechanically engaging a switch on the camera body, or by sending a signal to one of the camera interfaces described herein, or otherwise depending on the implementation of the close up or macro focus mode in a particular camera. Such mode setting could also include a pre-set focus plane adjustment.

H. Date and/or Time Stamping

It is sometimes desired to combine time stamping with authentication to prove that an authentication datum is fresh (e.g., to prevent replay attacks). Many digital cameras have an internal clock, providing date and/or time values that can be used for such time stamping.

I. Dual Factor Biometrics

It is also sometimes desired to use dual-factor biometrics for additional security. For example, some applications might use both image biometrics (e.g., fingerprint, retinal, etc.) and voice pattern (e.g. spoken utterance) biometrics. If the camera has a built in microphone (e.g., in many camcorders), the microphone can be used to add a voice print to the visual biometric. If not, the adapter might optionally include a microphone and voice acquisition module configured to capture a biometric utterance of a user. The utterance could be saved in WAV or other well known formats, and transmitted to the camera (e.g., via the accessory shoe interface, or infrared interface, both described above) for storage together with the image biometric. Alternatively, the utterance could be combined with the image utterance in an operation external to the camera, for example, via the in-line encoder described below.

J. Auxiliary Lighting

The biometric capture adapter may optionally also include one or more auxiliary lamps disposed to provide illumination of the biometric image. The lighting elements, placement, and control of the lamps are a matter of implementation choice that will be determined by the actual mechanical, electrical and optical configuration of the adapter and the camera. For example, some applications might require relatively low light as can be provided by LEDs, some applications might require white v. colored light, some applications might require a relatively high intensity flash, etc.

The auxiliary lighting can be powered by DC power (battery, solar cell, etc.) from the adapter, by an AC power supply at the adapter, by power from the camera, etc.

K. Command Module and/or Body Part Sensor

The biometric capture adapter may optionally also include a biometric command module for detecting placement of the body part into the adapter's receptacle, and/or for generating and transmitting one or more operational commands related to biometric data acquisition.

Body part detection can be implemented using a body part sensor configured to signal successful presentation of the body part to the receptacle. The details of such a sensor will depend on the particular implementation in question. For example, retinal biometrics might use an infrared detector, whereas fingerprint biometrics might use an infrared detector or a pressure-sensitive switch. Sensor types and technologies are well known to those skilled in the art and need not be described in detail here.

The operational commands may be triggered automatically upon detection of the body part, or manually upon operator's specification (e.g., via a switch, button, etc.).

The operational commands may include, without limitation, instructions to set a desired lighting level (either at the camera or the adapter), to set photography mode(s) at the camera (e.g., entering a close-up mode, low light mode, etc.), to effect the camera's zoom (e.g., optical or digital) capability to focus the camera, to set exposure settings, to "open a shutter" (e.g., mechanically, or electrically such as by energizing an array of image acquisition sensors), to take a picture, to apply a timestamp (see above), to acquire a voice print (see above), etc.

Of course, to the extent the array has selectable, or adjustable operational features of its own (e.g., lighting on/off/intensity, adjustable magnification, etc.), the command module could also include circuitry and/or a processor, to control such features.

These operational commands may be transmitted to the camera via any readily available signal interface including, without limitation, accessory shoe, infrared, and/or wired interfaces, as described in greater detail above.

L. In-Line Encoder Module

In some cases, it may be desired to perform additional processing on the biometric data beyond the capabilities of the camera's processor. For example, such post-processing might include compression (for bandwidth reduction), encryption (for additional security), data combination (e.g., of images and voice prints), color correction, conversion to grayscale format (either a multi-bit grayscale, or a 2-bit grayscale such as black and white), contrast correction, brightness correction, and/or any other operation needed to put the biometric datum into a format usable by the biometric authentication protocol in question. For convenience, we shall refer to all of these operations as encoding.

Those skilled in the art will appreciate how to implement these techniques using a combination of hardware, software, or microcode, either singly or in combination. For example and without limitation, the compression could use a standard algorithm with preset settings so that an image intended for remote authentication is sufficiently compressed for ease of transport but not too much that unacceptable degradation results. These techniques can conveniently be implemented in an in-line digital encoder connectable to an output interface of the camera. The encoder may be configured to operate automatically or upon operator command.

M. Camera as Authentication System

Optionally, the adapter can even be configured to operate as a complete authentication system. For example, if a secure memory within the adapter stores a reference biometric datum, then the adapter itself could digitally verify the specific biometric datum acquired from the user, rather than sending the acquired image to an authentication system for external verification. In such a configuration, the output of the adapter (or camera) could be as simple as a "yes/no" authentication verification, possibly coupled with a known private key signature of the camera, the adapter, or the user for proof against impersonation. The techniques necessary for the comparison are well known to those skilled in the art, being readily available from existing implementations of biometric and authentication protocols, and need not be described in detail herein. The processing capability needed for such verification can be implemented in the aforementioned biometric command module, the aforementioned in-line encoder, or in a combination thereof.

III. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims.

What is claimed is:

1. For use with a general purpose digital imaging device comprising a housing, a lens for imaging data, an image acquisition array configured to electronically capture said imaged data, a digital processor to transform said captured data into a predetermined image format, an electricity source configured to power said sensor and said digital processor, and an interface to output said captured data, an improvement comprising a biometric capture adapter including:
    (a) a coupler for attachment to said digital imaging device;
    (b) a receptacle configured to receive a body part having a biometric characteristic of interest; and
    (c) one or more optical components:
        (i) oriented with respect to said lens in a manner designed to acquire and scale said biometric characteristic to a predetermined size;
        (ii) said predetermined size being a function of (A) a size of said array and (B) an imaging capability of said lens; and (d) a structural housing connected to said coupler and at least one of said optical components;

said biometric capture adapter, upon coupling to said general purpose digital imaging device, thereby converting said general purpose digital imaging device into a biometric scanner.

2. The biometric capture adapter of claim 1 further comprising an auxiliary lamp disposed to provide illumination of said biometric image.

3. The biometric capture adapter of claim 1:
(x) wherein said digital imaging device includes an remote control interface for receiving operational commands of predetermined types; and
(y) further comprising a biometric command module configured to:
(i) detect placement of said body part having said biometric characteristic of interest into said receptacle; and
(ii) transmit to said remote control interface an operational command for biometric data acquisition.

4. The biometric capture adapter of claim 1 wherein said receptacle includes a guide for orienting said body part in a preferential orientation.

5. The biometric capture adapter of claim 1 wherein said receptacle includes a finger cavity.

6. The biometric capture adapter of claim 1 wherein said receptacle includes an eyecup.

7. The biometric capture adapter of claim 1 further comprising an in-line digital encoder:
(x) connectable to an output interface of said digital imaging device for receiving said biometric image; and
(y) configured to digitally process said image to a format suitable for comparison with a stored version thereof during an authentication process.

8. The biometric capture adapter of claim 1 wherein said in-line digital encoder is configured to encrypt said biometric image.

9. The biometric capture adapter of claim 1 wherein said in-line digital encoder is configured to convert said biometric image to grayscale format.

10. The biometric capture adapter of claim 1 wherein said digital imaging device includes:
(x) a microphone and voice acquisition module configured to capture a biometric utterance of a user providing said biometric image; and
(y) said biometric image and said biometric utterance corresponding to a dual-factor biometric authentication protocol.

11. The biometric capture adapter of claim 1 wherein said one or more optical components include an image rotator configured to rotate said biometric image along an optical axis of said lens.

12. The biometric capture adapter of claim 1 wherein said one or more optical components include a mirror configured to rotate said biometric image into a plane perpendicular to an optical axis of said lens.

13. The biometric capture adapter of claim 1 wherein said one or more optical components include a lens disposed to bring said biometric image into a desired focus at said array.

14. The biometric capture adapter of claim 1 further comprising a body part sensor configured to signal successful presentation of said body part to said receptacle.

15. The biometric capture adapter of claim 1 wherein said body part sensor includes an infrared detector.

16. The biometric capture adapter of claim 1 wherein said body part sensor includes a pressure-sensitive switch.

17. The biometric capture adapter of claim 1 wherein said coupler includes a threaded mount for attachment to a threaded housing of said lens.

18. The biometric capture adapter of claim 1 wherein said coupler includes a threaded shaft for attachment to a tripod mount of said digital imaging device.

19. The biometric capture adapter of claim 1 wherein said coupler includes a plate for attachment to an accessory shoe of said digital imaging device.

20. The biometric capture adapter of claim 19:
(i) wherein said accessory shoe is capable of receiving electrical commands for said digital imaging device; and
(ii) further comprising means for coordinating operation of said biometric capture adapter and digital imaging device through said accessory shoe.

21. A biometric capture adapter for converting a digital camera into a biometric data acquisition device, comprising:
(a) a coupler for attachment to said digital camera;
(b) a receptacle configured to receive a body part having a biometric characteristic of interest; and
(c) one or more optical components:
(i) oriented with respect to said lens to optically scale said biometric characteristic to a predetermined size, thereby forming a biometric image;
(ii) said predetermined size being a function of (A) a size of an array of said digital imaging camera, and (B) an imaging capability of a lens of said digital camera; and
(d) a structural housing connected to said coupler and at least one of said optical components.

22. The biometric capture adapter of claim 21:
(x) wherein said digital imaging device includes an remote control interface for receiving operational commands of predetermined types; and
(y) further comprising a command module configured to:
(i) detect placement of said body part having said biometric characteristic of interest into said receptacle; and
(ii) after detection of said body part, transmit an operational command to said remote control interface.

23. The biometric capture adapter of claim 21 further comprising an in-line digital encoder:
(x) connectable to an output interface of said digital imaging device for receiving said biometric image; and
(y) configured to digitally process said image to a format suitable for comparison with a stored version thereof during an authentication process.

24. The biometric capture adapter of claim 21 further comprising an auxiliary lamp disposed to provide illumination of said biometric image.

25. The biometric capture adapter of claim 21 wherein said digital imaging device includes:
(x) a microphone and voice acquisition module configured to capture a biometric utterance of a user providing said biometric image; and
(y) said biometric image and said biometric utterance corresponding to a dual-factor biometric authentication protocol.

26. A method for acquiring biometric data, comprising:
(a) providing a general purpose digital camera;
(b) coupling a biometric capture adapter to said digital camera thereby converting said digital camera to a biometric scanner;
(c) placing a body part having a biometric characteristic of interest into a receptacle of said biometric capture adapter; and (d) acquiring an image of said biometric characteristic by operating said general purpose digital camera in conjunction with said biometric capture adapter; wherein said adapter including optical components oriented to acquire and scale said biometric characteristic to a predetermined size.

27. The method of claim 26 where said (d) includes:
(i) detecting placement of said body part into said receptacle; and
(ii) based on said detecting, automatically transmitting an operational command related to biometric data acquisition to said digital camera.

28. The method of claim 27 where said (ii) includes sending a signal to a remote control interface of said digital camera.

29. The method of claim 26 further comprising post-processing said acquired image via an in-line encoder:
(i) connected to an output interface of said digital imaging device; and
(ii) configured to digitally process said image to a format suitable for comparison with a stored version thereof.

30. The method of claim 26 further comprising performing an authentication process on said acquired image by comparison against a stored version thereof.

31. The method of claim 26 further comprising, at least before said (d), engaging auxiliary lighting within said biometric capture adapter to provide illumination of said biometric characteristic.

32. The method of claim 26:
(x) further comprising capturing a biometric utterance of a user providing said biometric image;
(y) said biometric image and said biometric utterance corresponding to a dual-factor biometric authentication protocol.

33. The method of claim 26 wherein:
(x) said digital camera includes a removable lens; and
(y) said (b) includes placing an optical component between a body of said digital camera and said removable lens.

34. The method of claim 26 further comprising time stamping said acquired biometric image.

35. The method of claim 26 further comprising:
(e) authenticating said acquired image against a reference image; and
(f) generating an authentication indicate therefrom.

36. The method of claim 35 further comprising applying a private key signature to said authentication indicate.

37. A biometric capture adapter for converting a digital camera into a biometric data acquisition device, comprising:
(a) means for coupling said adapter to said digital camera thereby converting said digital camera to a biometric scanner;
(b) means for receiving a body part having a biometric characteristic of interest; and
(c) means for optically scaling said biometric characteristic to a size appropriate for imaging in accordance with said digital camera's
(A) image acquisition array, and
(B) imaging capability.

38. A biometric capture adapter converting a digital camera into a device for acquiring biometric data, comprising:
(a) means for coupling a biometric capture adapter to said digital camera thereby converting said digital camera to a biometric scanner;
(b) means for placing a body part having a biometric characteristic of interest into a receptacle of said biometric capture adapter; and
(c) means for acquiring an image of said biometric characteristic by operating said general purpose digital camera in conjunction with said biometric capture adapter;
wherein said adapter including optical components oriented to acquire and scale said biometric characteristic to a predetermined size.

\* \* \* \* \*

UNITED STATES PATENT AND TRADEMARK OFFICE
CERTIFICATE OF CORRECTION

| | | |
|---|---|---|
| PATENT NO. | : 7,181,048 B2 | Page 1 of 1 |
| APPLICATION NO. | : 10/185209 | |
| DATED | : February 20, 2007 | |
| INVENTOR(S) | : Leo Robert Blume | |

It is certified that error appears in the above-identified patent and that said Letters Patent is hereby corrected as shown below:

In column 12, line 6, in Claim 35, delete "indicate" and insert -- indicia --, therefor.

In column 12, line 8, in Claim 36, delete "indicate" and insert -- indicia --, therefor.

Signed and Sealed this

Twenty-third Day of December, 2008

JON W. DUDAS
*Director of the United States Patent and Trademark Office*